United States Patent [19]

Hatsutta et al.

[11] Patent Number: 4,583,781
[45] Date of Patent: Apr. 22, 1986

[54] MOTOR VEHICLE SEAT

[75] Inventors: Susumu Hatsutta; Toshio Furukawa, both of Akishimashi, Japan

[73] Assignee: Tachikawa Spring Co., Ltd., Tokyo, Japan

[21] Appl. No.: 640,527

[22] Filed: Aug. 14, 1984

[30] Foreign Application Priority Data

Aug. 19, 1983 [JP] Japan .................. 58-152287

[51] Int. Cl.⁴ ............................................. A47C 3/00
[52] U.S. Cl. ......................................... 297/284; 297/312
[58] Field of Search ............ 297/284, 312, 201, 455, 297/DIG. 1; 5/481, 465, 447, 446

[56] References Cited

U.S. PATENT DOCUMENTS

| 3,600,037 | 8/1971 | Lohr | 297/284 X |
| 3,883,173 | 5/1975 | Shephard et al. | 297/312 |
| 4,159,847 | 7/1979 | Arai | 297/284 |
| 4,324,431 | 4/1982 | Murphy et al. | 297/284 |
| 4,491,365 | 1/1985 | Murakami | 297/284 X |

FOREIGN PATENT DOCUMENTS

| 2605952 | 8/1977 | Fed. Rep. of Germany | 297/284 |
| 1228432 | 8/1960 | France | 297/312 |
| 36732 | 3/1983 | Japan | 297/312 |

Primary Examiner—William E. Lyddane
Assistant Examiner—José V. Chen
Attorney, Agent, or Firm—Hoffmann, Dilworth, Barrese & Baron

[57] ABSTRACT

A seat for use in a vehicle such as a motor car is disclosed in which a thigh support portion and a bottom support portion are integrally foamed with each other, and separate lower frame wires are embedded independently of each other within the respective support portions, whereby the thigh support portion can be smoothly moved up and down by a thigh support device provided therein.

3 Claims, 4 Drawing Figures

MOTOR VEHICLE SEAT

BACKGROUND OF THE INVENTION

1. Field of the Invention

The present invention relates to a vehicle (motor vehicle) seat and, more particularly, to an improved motor vehicle seat which includes a buttocks support portion and a thigh support portion integrally foamed with each other and also which is provided with a thigh support device in the thigh support portion.

2. Description of the Prior Art

Conventionally, within a cushion member having a buttocks support portion and a thigh support portion foamed integrally with each other in a seat of the above-mentioned type, there is embedded a frame wire so as to maintain the rigidity and form-retaining capability of the foam member. Such frame wire is arranged to extend continuously between the buttocks and thigh support portions of the cushion member. Therefore, the conventional seat provided with the thigh support device in the thigh support portion is disadvantageous in that the thigh support portion cannot be raised simply because of the rigidity of the frame wire embedded into the cushion member. To avoid such disadvantage, there is proposed a seat in which a thigh support portion is formed independently of a buttocks support portion and a thigh support device is provided in the thigh support portion. However, this seat also has several drawbacks: namely, it is complicated to manufacture and assemble a cushion member; the number of man-hours required for manufacture are increased, and, the finished product cannot be supplied at low cost.

SUMMARY OF THE INVENTION

The present invention aims at eliminating the drawbacks seen in the above-mentioned conventional vehicle seats.

Accordingly, it is an object of the invention to provide an improved motor vehicle seat which permits a reduction of an operation force to operate a thigh support device.

In attaining this object, according to one aspect of the invention, a movable lower frame wire is embedded in a thigh support portion in which said thigh support device is provided separately form a fixed lower frame wire embedded in a bottom (or, buttocks) portion, and a bent portion is disposed between the movable and fixed lower frame wires. Thus, the thigh support portion can be easily moved up and down by means of operation of the thigh support device so that its operation force can be reduced over the prior art seat.

It is another object of the invention to provide a seat of lessened weight. For this purpose, according to another aspect of the invention, both the above-mentioned lower frame wires are respectively embedded adjacent to the bottom surfaces of the above-mentioned support portions each formed of foam material and thus these wires serve as frames respectively. Therefore, there is eliminated the need for a frame formed of a flat-plate metal or hard synthetic resin as in the prior art seat, which permits a reduction of weight of the seat. This also simplifies the structure of the seat and the seat can be supplied at lower cost.

It is still another object of the invention to provide a seat which is improved in the manner of its manufacture (or, which can be manufactured more easily). To this end, both of the above-mentioned lower frame wires are embedded in the foam bottom and thigh support portions respectively when these two support portions are foamed integrally with each other.

The foregoing and other objects and aspects of the invention will be apparent from a reading of the following detailed description of the disclosure found in the accompanying drawings and the novelty thereof pointed out in the appended claims.

DETAILED DESCRIPTION OF A PREFERRED EMBODIMENT OF THE INVENTION

Figure 1:
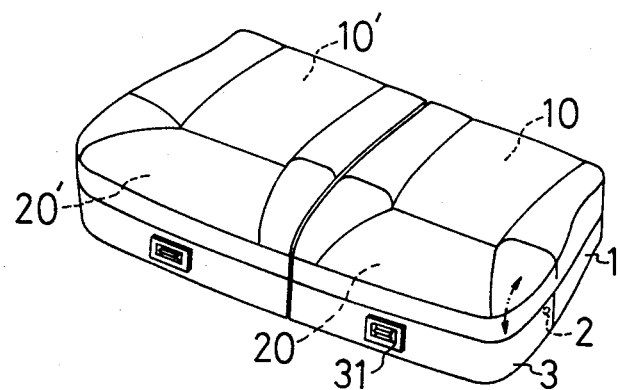
FIG. 1 is a perspective view of an embodiment of the invention.

FIG. 1 illustrates a seat cushion in a bench-type motor vehicle seat. This seat cushion is provided with two thigh support devices (a) which are located in the right and left portions of a seat frame (1) independently of each other. Two independent thigh support portions (20) (20') are disposed on the right and left thigh support devices (a), respectively. These two thigh support portions (20) (20') are formed of foam material and are foamed integrally with two buttocks (bottom) support portions (10) (10') of foam material. The bottom support portions (10) (10') are formed integrally with or separately from each other. These two bottom support portions (10) (10') are disposed on the integrally formed frame-like seat frame (1), while the two thigh support portions (20) (20') are placed on a movable frame (3) which is vertically rotatably mounted by a bolt (2) to the front portion of the seat frame (1).

The above-mentioned bottom support portions (10) (10') and thigh support portions (20) (20') are mold formed of polyurethane foam integrally, with a fixed lower frame wire (11) and a movable lower frame wire (21) being embedded in the respective support portions during such mold forming.

Figure 2:
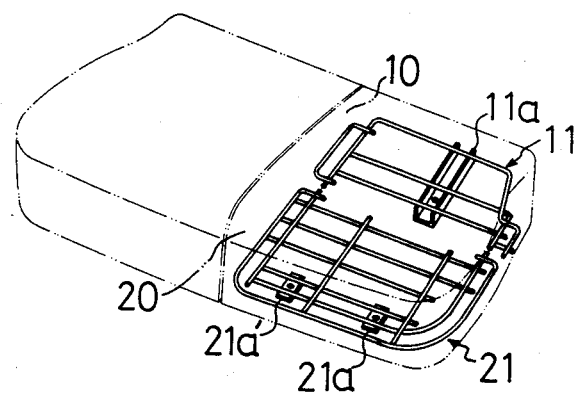
FIG. 2 is a perspective view of the above embodiment, partially in section for illustration of a fixed lower frame wire and a movable lower frame wire.

FIG. 2 illustrates the above-mentioned fixed lower frame wire (11) and movable lower frame wire (21). These lower frame wires (11) and (21) are formed by assembling crosswise wire materials and welding them to anchoring elements (11a), (21a) and (21a') at desired locations thereof. Each of anchoring elements (11a), (21a) and (21a') is provided with a threaded bore with which fastening bolts (12) (22) are threadedly engaged.

Figure 3:
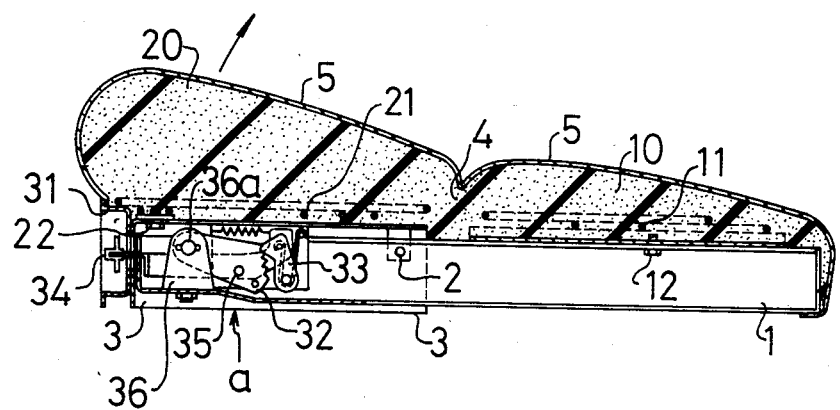
FIG. 3 is a longitudinally sectional view of the same embodiment of the invention; and, FIG. 4 is a longitudinally sectional view of the same embodiment with its thigh support portions raised.

FIG. 3 is a longitudinally sectional view of an embodiment of the invention. As shown in the illustrated embodiment, the above-mentioned lower frame wires (11) and (21) are embedded respectively adjacent to the bottom portions and along the bottom surfaces of the bottom support portions (10) and thigh support portions (20). Each of anchoring elements (11a), (21a) and (21a') is exposed externally or embedded to such a degree of depth as can be observed from outside. Both of the support portions (10) and (20) are fixed via such anchoring elements to seat frame (1) and movable frame (3) by fastening bolts (12) and (22).

The above-mentioned fixed lower frame wire (11) and movable lower frame (21) are embedded and spaced from each other at a predetermined interval, and crease portion (4) is provided between wires (11) and (21). The thigh support portions (20) are moved up and down about crease portion (4) by means of the thigh support devices (a). The spacing between fixed lower frame wire (11) and movable lower frame wire (21) that defines crease portion (4) is adjusted by the vertical thickness of the foam material in the associated portion, the rising angle of the thigh support portions (20), and the like.

In the drawings, reference numeral (32) designates a lock piece. This lock piece (32) is secured by a shaft of rotation (35) to movable frame (3), is provided at one end thereof with a pin to be inserted through an elongated bore (36a) of a projection (36) in the seat frame (1), and is along one side edge thereof formed with a toothed portion. Reference numeral (33) designates a stopper for engagement with the toothed portion of lock piece (32) which is energized by a spring such that it is brought into engagement with the toothed portion of lock piece (32). This stopper (33) is also connected to a lock release lever represented by numeral (34) in the drawings. In operation, if lock release lever (34) is moved upwardly, then stopper (33) is disengaged from the toothed portion of lock piece (32) so as to release the locking between them. In other words, a hook portion (31) provided in movable frame (3) is lifted up to raise movable frame (3). This raising causes lock piece (32) to rotate about the shaft of rotation (35) and stopper (33) to engage one of the lock grooves of lock piece (32) at a desired position so that movable frame (3) can be retained at a predetermined position.

Figure 4:
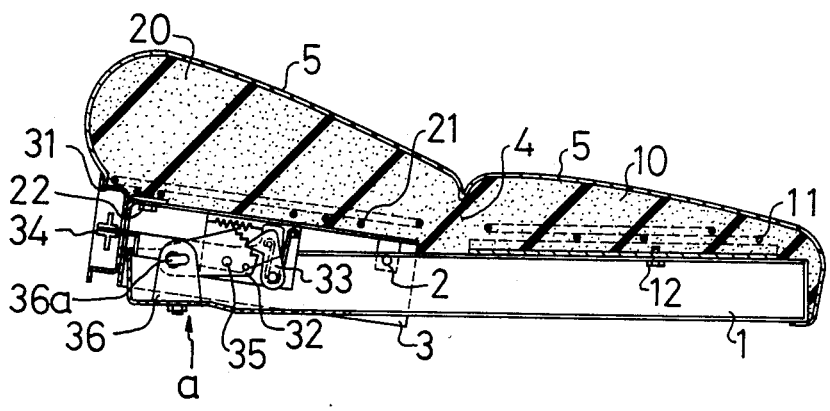

FIG. 4 illustrates thigh support portions (20) that have been raised upwardly by operating thigh support device (a). Specifically, if an operating portion of lock release lever (34) which is projected from a through bore of hook portion (31) of the movable frame (3) is pushed to move upward, then stopper (33) is pushed to move upward so as to release locking, and at the same time shaft of rotation (35) mounted to movable frame (3) is rotationally moved by a return spring to cause stopper (33) to be brought into engagement with an upper-position groove of lock piece (32) so that another locking is achieved between the two members, i.e., lock piece (32) and stopper (33).

Accordingly, the above-mentioned thigh support devices (a) permit the thigh support portions (20) to be moved up and down with crease portion (4) as the center of rotation.

In the drawings, numeral (5) represents a top member for covering both support portions (10) and (20), which has ends fixed to seat frame (1) and movable frame (3), respectively.

Due to the above-mentioned structure, the present invention provides several advantages over the prior art seat as follows:

Provision of the crease portion between the fixed and movable lower frame wires reduces the force required for raising and lowering the thigh support devices to which the movable wire is fixed.

Both of the lower frame wires can be embedded simultaneously when the bottom and thigh support portions are integrally formed and thus the seat is simple to manufacture and can be supplied at low cost.

Since the embedment of the two lower frame wires adjacent to the bottom surfaces of the two support portions eliminates the need for providing a flat-plate frame or the like for carrying the two support portions thereon, the seat is simple in structure and the entire weight of the seat can be reduced.

What is claimed is:

1. A motor vehicle seat which comprises:
  (a) a resilient foam cushion member possessing a buttocks support portion integral with a thigh support portion;
  (b) a crease portion defined at the juncture of the buttocks support portion and the thigh support portion of the cushion member, said crease facilitating vertical pivotal movement of the thigh support portion of the cushion member relative to the buttocks support portion thereof;
  (c) a fixed lower frame wire embedded within the resilient foam of the buttocks support portion of the cushion member;
  (d) a fixed seat frame supporting said fixed lower frame wire;
  (e) a movable lower frame wire embedded within the resilient foam of the thigh support portion of the cushion member;
  (f) a movable seat frame supporting said movable lower frame wire, said movable seat frame being vertically pivotally connected to said fixed seat frame;
  (g) means for locking the position of the movable seat frame relative to the fixed frame member; and,
  (h) means for unlocking the position of the movable seat member relative to the fixed frame member cooperating with the aforesaid locking means such that one of several new positions of the movable seat member relative to the fixed frame member can be effected and maintained.

2. The vehicle seat as set forth in claim 1, wherein said movable frame is rotatably mounted to said seat frame by a bolt.

3. The vehicle seat as set forth in claim 1, wherein said movable lower frame wire and said fixed lower frame wire are respectively formed by assembling a number of wire materials crosswise and welding them together.

* * * * *